L. S. LACHMAN.
ELECTRIC SPOT WELDING APPARATUS.
APPLICATION FILED JAN. 19, 1916.
1,234,673.
Patented July 24, 1917.
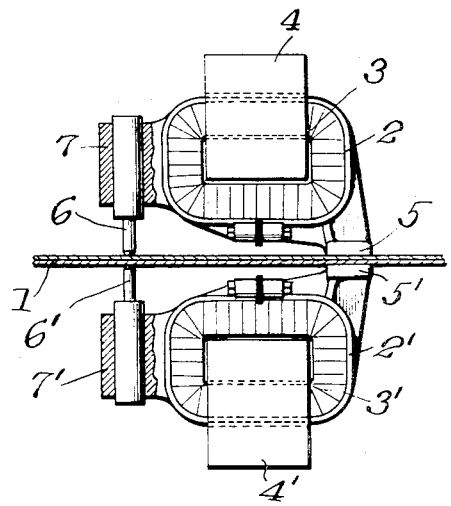
INVENTOR
Laurence S. Lachman.
BY
ATTORNEYS

UNITED STATES PATENT OFFICE.

LAURENCE S. LACHMAN, OF NEW YORK, N. Y., ASSIGNOR, BY MESNE ASSIGNMENTS, TO THOMSON SPOT WELDER COMPANY, OF BOSTON, MASSACHUSETTS, A CORPORATION OF MASSACHUSETTS.

ELECTRIC SPOT-WELDING APPARATUS.

1,234,673.     Specification of Letters Patent.     Patented July 24, 1917.

Application filed January 19, 1916. Serial No. 72,912.

*To all whom it may concern:*

Be it known that I, LAURENCE S. LACHMAN, a citizen of the United States, and a resident of New York, in the county of New York and State of New York, have invented certain new and useful Improvements in Electric Spot-Welding Apparatus, of which the following is a specification.

My invention relates to that class of electric welding apparatus in which transformers are employed for supplying the heating current to the work and more particularly to said machines when organized for the purpose of heating the work at a spot or point of small area in the surface of a large sheet, plate or metal construction in order to produce a weld of any kind, either between the surface of said sheet and another sheet superposed on it or for the purpose of attachment of a comparatively small piece of work to said sheet or plate.

The special object of my invention is to provide a large and practically unlimited work gap without the necessity of employing overhanging arms, as in the class of machines wherein the two electrodes respectively of one transformer are arranged at opposite sides of the work, and at the same time to permit practically all of the electric energy developed in the machine to be expended in the heating of the work at the desired point or location of weld by a novel arrangement whereby two transformers have their secondaries working in series to supply the heating energy and whereby the heating takes place at one interruption or gap only in the series circuit thereof.

To these ends my invention consists in disposing the two welding transformers respectively at opposite sides of the work or work gap and constructing one pair of poles in proper manner for application to the work at the point to be heated or where the weld is to be made and constructing and applying the other pair of electrodes of said transformers so as to engage some portion of the work at another point, but in a manner to permit a free passage of the current from one transformer secondary to the other in series relation without any substantial heating or expenditure of electrical energy. By this arrangement and construction I secure not only an unlimited gap because each transformer is arranged wholly to one side of the plane of the work, but I concentrate the heating effect in one gap in the electric circuit of said transformer secondaries and thereby attain a more economical operation, owing to the fact that substantially all of the energy of said transformers is utilized in a most effective way at one point of interruption only in their series circuit.

In the accompanying drawings I have shown a typical arrangement and disposition of transformers embodying my invention with one pair of electrodes thereof organized or formed for the purpose of producing a spot weld between two plates of metal, the other pair being formed for engagement with the work to allow free passage of current from one to the other.

As will be readily understood by those skilled in the art, the transformers might be constructed or organized as to their work-engaging electrodes to perform other kinds of electric heating or welding. It will also be readily understood that any desired mechanical devices or constructions of devices might be employed for moving the transformers themselves or the electrodes thereof to and from the work and as such expedients are well understood in the art and may be varied indefinitely as to form, they are not herein shown or described as to their details.

In the drawings 1 indicates the work which may be, for instance, two plates of sheet metal to be welded together at a spot in their opposed surfaces. 2 indicates the secondary of one welding transformer, 3 the primary thereof and 4 the usual sheet metal core. Said transformer with its terminals or electrodes is arranged wholly to one side of the plane of the work. The parts of a similar transformer similarly arranged at the opposite side of the work are designated by similar numerals with the prime mark attached. The said secondaries terminate each as to one terminal in an electrode 6 or 6', each of which at its extremity is properly reduced to concentrate the current or localize it in a small area of the work to produce the desired heating effect and to afford also by preference the necessary means for applying pressure to effect the weld, said electrodes being respectively movable to and from the work in a mounting 7 or 7' constituting a part of the secondary. Although both electrodes are shown reduced, it is, as well understood in the art, necessary to make one of them only of small size or of small contact area and it is also necessary to make one of them only movable, although for some purposes it is desirable to make them both movable.

As to their opposite terminals 5, 5', said transformer secondaries are enlarged or have sufficient area of contact with the work at a point remote from the point to be heated or welded to form a means for establishing a good conducting connection with the work and between the transformer secondaries through the section of work with which said electrodes or terminals 5, 5' engage. Also the apparatus is organized as to its circuit connections so that the current of said secondaries shall flow in series.

As will be seen, the effect is that substantially all the energy generated by the machine is made effective as the heating agent in a single gap in the circuit of said secondaries, the remaining portion of the circuit of said secondaries being organized or constructed to allow flow of current with minimum resistance, thereby securing the desired result of a minimum length of secondary and the concentration of the energy or liberation thereof at one point only in the circuit.

In the operation of applying the transformers to the spot or part to be welded it is obvious that the lower transformer may be at all times fixed, the work resting in such case upon the electrodes of the latter. The lower electrode, being movable in its head or sleeve, can be readily brought firmly up into engagement with the work. The upper transformer, being brought firmly into engagement with the work in the relation shown, the terminal 5 makes the necessary good conducting connection therewith while the electrode 6, being independently movable, secures the necessary contact at the point or location of the weld and permits the weld to be effected by the pressure exerted thereby at the proper time.

As will be obvious to those skilled in the art a machine having its transformers disposed and connected according to my invention lends itself particularly to use in the making of spot welds at any point or points in the surface of sheets of metal of indefinitely large area and in a highly economical manner, by reason of the compactness of the apparatus as well as the shortness of the secondary circuit.

What I claim as my invention is:

1. In an electric welding apparatus, the combination substantially as described, of two transformers arranged respectively at opposite sides of the work, said transformers having one pair of secondary terminals applied at the same work gap to produce a heating by the flow of electric energy through the secondaries in series while the other pair of terminals of said secondaries are electrically connected to the work at another portion thereof in a manner to afford a free conducting connection without substantial heating effect, whereby substantially the whole electric energy developed by both transformers is expended in heating the weld at one point of interruption only in their circuit.

2. In an electric welding apparatus, the combination substantially as described, of two welding transformers each located as to both poles on the same side of the work gap and each adapted to engage the work as to one pole at the spot or zone of heating in a manner to produce the desired heating effect, and as to the other pole engaging the work in a manner to allow free passage of the current without substantial heating thereof, said transformer secondaries being arranged to work in series whereby substantially all the electric energy of the two transformer secondaries is expended in one work-heating gap in the electric circuit thereof.

Signed at New York in the county of New York and State of New York this 6th day of October A. D. 1915.

LAURENCE S. LACHMAN.

Witnesses:
F. B. TOWNSEND,
REMINGTON SCOTT.